US012519247B2

(12) United States Patent
Yang et al.

(10) Patent No.: US 12,519,247 B2

(45) Date of Patent: Jan. 6, 2026

(54) RADIATOR, RADIATION ASSEMBLY AND ANTENNA

(71) Applicant: RFS Technologies, Inc., Meriden, CT (US)

(72) Inventors: Wenmin Yang, Shanghai (CN); Qiang Liu, Shanghai (CN)

(73) Assignee: RFS Technologies, Inc., Meriden, CT (US)

(*) Notice: Subject to any disclaimer, the term of this patent is extended or adjusted under 35 U.S.C. 154(b) by 137 days.

(21) Appl. No.: 18/513,480

(22) Filed: Nov. 17, 2023

(65) Prior Publication Data

US 2024/0162628 A1 May 16, 2024

Related U.S. Application Data

(63) Continuation of application No. PCT/CN2021/096103, filed on May 26, 2021.

(51) Int. Cl.
*H01Q 21/06* (2006.01)
*H01Q 1/42* (2006.01)

(52) U.S. Cl.
CPC ............. *H01Q 21/062* (2013.01); *H01Q 1/42* (2013.01)

(58) Field of Classification Search
None
See application file for complete search history.

(56) References Cited

U.S. PATENT DOCUMENTS 8,994,602 B2 * 3/2015 Plet ........................ H01Q 1/246 343/797
9,263,798 B1 * 2/2016 Piazza .................... H01Q 21/29
(Continued)

FOREIGN PATENT DOCUMENTS

CN 107799878 A 3/2018
CN 110858679 A 3/2020
(Continued)

OTHER PUBLICATIONS

International Search Report and Written Opinion for International Application No. PCT/CN2021/096103 mailed Feb. 25, 2022.
(Continued)

*Primary Examiner* — Crystal L Hammond
(74) *Attorney, Agent, or Firm* — Myers Bigel, P.A.

(57) ABSTRACT

Embodiments of the present disclosure provide a radiator and a radiation assembly for an antenna and an associated antenna. The radiator comprises a conductive body adapted to be arranged in an antenna for transmission and/or reception of radiation in a first frequency band, wherein along a length direction of the conductive body, the conductive body comprises: a plurality of first conductive members; and at least one second conductive member galvanically coupled to the plurality of first conductive members and having a size smaller than a size of each of the first conductive member to thereby converge induced current electrometrically coupled onto the radiator by radiation in a second frequency band different from the first frequency band. With the radiation assembly comprising the radiator, other antennas or radiation assemblies operating at different frequency bands may be located closer to the radiation assembly because less electromagnetic coupling occurs between the two antennas/radiation assemblies. Accordingly, more radiation assemblies operating at different frequency bands can be arranged in the antenna, thereby increasing the radiation range of the base station without degrading the performance of the antenna and even the base station.

19 Claims, 8 Drawing Sheets

(56) References Cited

U.S. PATENT DOCUMENTS

| | | | |
|---|---|---|---|
| 10,135,156 B2 | 11/2018 | Prinsloo et al. | |
| 10,741,924 B1 | 8/2020 | McGrath et al. | |
| 2018/0358692 A1 | 12/2018 | Semonov et al. | |
| 2019/0273315 A1 | 9/2019 | Hu et al. | |
| 2020/0127389 A1 | 4/2020 | Li et al. | |
| 2020/0161748 A1 | 5/2020 | Isik et al. | |
| 2020/0303820 A1* | 9/2020 | Jang | H01Q 15/14 |
| 2020/0328533 A1 | 10/2020 | Sundararajan et al. | |
| 2020/0395670 A1 | 12/2020 | Mancewicz et al. | |

FOREIGN PATENT DOCUMENTS

| | | | | |
|---|---|---|---|---|
| CN | 111293418 A | | 6/2020 | |
| CN | 112368885 A | | 2/2021 | |
| GB | 2517735 A | | 3/2015 | |
| JP | H11-97915 A | | 4/1999 | |
| WO | WO-2020171976 A1 | * | 8/2020 | H01Q 1/246 |

OTHER PUBLICATIONS

International Preliminary Report on Patentability for International Application No. PCT/CN2021/096103 mailed Dec. 7, 2023.

Mirmozafari et al., A crossed dipole phased array antenna architecture with enhanced polarization and isolation characteristics. IEEE Transactions on Antennas and Propagation. Feb. 3, 2020;68(6):4469-78.

Pan et al., Dual-polarized directive ultrawideband antenna integrated with horn and Vivaldi array. IEEE Antennas and Wireless Propagation Letters. Nov. 19, 2020;20(1):48-52.

EP 21942277.1, Feb. 6, 2025, Extended European Search Report.

Extended European Search Report dated Feb. 6, 2025 in connection with European Application No. 21942277.1.

* cited by examiner

RADIATOR, RADIATION ASSEMBLY AND ANTENNA

CROSS-REFERENCE TO RELATED APPLICATIONS

This application is a continuation of International Application Serial No. PCT/CN2021/096103, filed on May 26, 2021, entitled "RADIATOR, RADIATION ASSEMBLY AND ANTENNA."

FIELD

Example embodiments of the present disclosure generally relate to an antenna, and specifically to a radiator and a radiation assembly for an antenna.

BACKGROUND

Wireless mobile communication is one of the most rapidly growing industries. The capacity of wireless mobile communication systems is closely related to frequency usage. The frequency spectrum on which wireless communication equipment depends is a limited natural resource. A major problem of the radio communication system is the limited availability of the radio-frequency spectrum due to high demand. Therefore, the ideal mobile system can be defined by a system operating within a limited assigned frequency band and serving an almost unlimited number of users.

This inevitably involves the provision of radio coverage in a number of frequency bands and complicates the design of the network base transceiver stations. With respect to antennas, the expense of multiple base-station antenna installations and public resistance to unsightly antenna placements has motivated the installation of multiband antennas at base-stations and thus avoids an increase of antenna masts and payloads. The multiband antenna is an antenna designed to operate in multiple bands of frequencies. Multiband antennas use a design in which one part of the antenna is active for one band, while another part is active for a different band. Multiband antennas are usually expected to demonstrate comparable performance measures (especially input impedance, radiation pattern, and polarization) in each of their operating bands and have been the subject of vigorous research over the past two decades.

SUMMARY

Multiband antennas usually encounter problems such as electromagnetic coupling, which degrade the efficiency, correlation and eventually deteriorate the communication quality of the entire antenna system. In order to at least partially address the above and other potential problems, example embodiments of the present disclosure provide a radiator and a radiation assembly for an antenna as well as an associated antenna.

In a first aspect, example embodiments of the present disclosure provide a radiator for an antenna. The radiator comprises a conductive body adapted to be arranged in an antenna for transmission and/or reception of radiation in a first frequency band, wherein along a length direction of the conductive body, the conductive body comprises: a plurality of first conductive members; and at least one second conductive member galvanically coupled to the plurality of first conductive members and having a size smaller than a size of each of the plurality of first conductive members to thereby decrease an amount of electromagnetic coupling from radiation in a second frequency band different from the first frequency band.

With the radiation assembly comprising the radiator, other antennas or radiation assemblies operating at different frequency bands may be located closer to the radiation assembly because less electromagnetic coupling occurs between the two antennas/radiation assemblies. In this way, more radiation assemblies operating at different frequency bands can be arranged in the antenna, thereby increasing the radiation range of the base station without degrading the performance of the antenna and even the base station.

In some example embodiments, the size comprises a width, and the width of each of the plurality of first conductive members is larger than a width of the at least one second conductive member. This arrangement can make the induced current more converged with reduced secondary radiation efficiency.

In some example embodiments, the width of the at least one second conductive member is below a quarter of the width of the first conductive member.

In some example embodiments, the size comprises a length, and the length of each of the at least one second conductive member is below one-eighth of a center wavelength of the radiation in the second frequency band. This arrangement can further reduce secondary radiation efficiency of the induced current, thereby improving the performance of the radiator.

In some example embodiments, the first conductive member has one or more of following shapes: rhombus, kite, diamond, circle, ellipse, rectangle, hexagon, octagon, parallelogram, and trapezoid. This arrangement can further facilitate the convergence of the induced current on the second conductive member.

In some example embodiments, the at least one second conductive member is arranged at a predetermined distance from an edge of the conductive body in the length direction. This arrangement allows the second conductive member to be arranged where the induced current is more concentrated, thereby further improving the performance of the radiator.

In some example embodiments, the conductive body is at least partially symmetrical with respect to at least one of a first midline of the conductive body extending along the length direction or a second midline extending along a width direction.

In some example embodiments, at least one second conductive member is arranged on a side of a first midline of the conductive body extending along the length direction. The above arrangements make the manufacturing of the radiator more flexible, to thereby adapt to different needs and improve applicability.

In some example embodiments, the conductive body is made from a sheet metal or using metal or conductive material formed onto a non-conductive support.

In a second aspect, a radiation assembly is provided. The radiation assembly comprises a supporting portion made of a conductive material; at least one feeding portion electrically coupled to the supporting portion; and at least one radiator according to the first aspect as mentioned above electrically coupled to the supporting portion.

In some example embodiments, the radiation assembly comprises at least one dipole.

In a third aspect, an antenna is provided. The antenna is configured to operate in multiple bands of frequencies and comprises at least one radiation assembly as mentioned in the second aspect.

In a fourth aspect, a base station is provided. The base station comprises at least one radiation assembly as mentioned in the second aspect.

In a fifth aspect, an antenna enclosure is provided. The antenna enclosure comprises at least one radome for housing at least one radiation assembly as mentioned in the second aspect.

It is to be understood that the Summary is not intended to identify key or essential features of example embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, the same reference numerals usually represent the same components.

Throughout the drawings, the same or similar reference symbols are used to indicate the same or similar elements.

DETAILED DESCRIPTION

Figure 1:
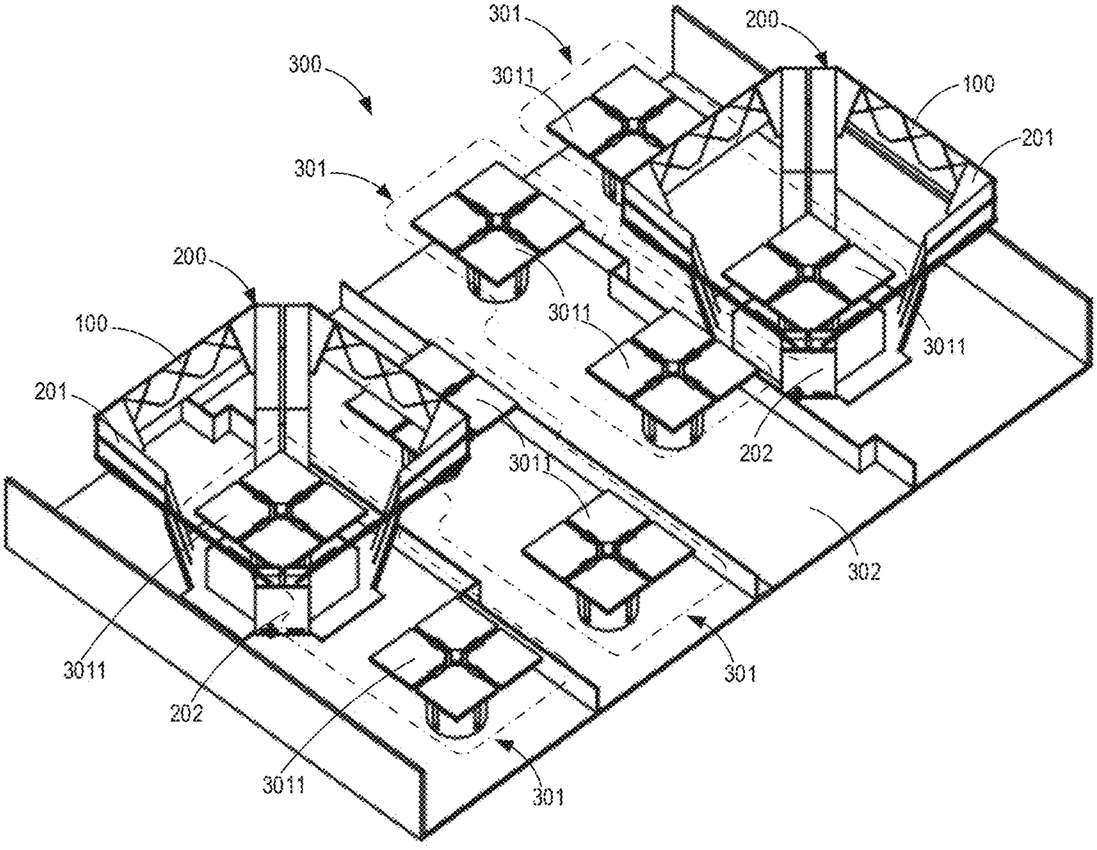
FIG. 1 shows a perspective view of a portion of array antennas acting as a multiband antenna according to example embodiments of the present disclosure.

The principle of the present disclosure will now be described with reference to some example embodiments. It is to be understood that these embodiments are described only for the purpose of illustration and to help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skill in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to apply such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to limit example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

- (i) a combination of analog and/or digital hardware circuit(s) with software/firmware and
- (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including any claims. As a further example, as used in this application, the term circuitry also covers an implementation of only a hardware circuit or processor (or multiple processors) or portion of a hardware circuit or processor and its (or their) accompanying software and/or firmware. The term circuitry also covers, for example, and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future types of communication technologies and systems with which the present disclosure may be embodied. The scope of the present disclosure should not be seen as limited to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but is not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

In communication networks where a number of network devices are jointly deployed in a geographical area to serve respective cells, a terminal device may have an active connection with a network device when being located within the corresponding cell. In the active connection, the terminal device may communicate with that network device on the frequency band in both an uplink (UL) and a downlink (DL). The terminal device may need to switch a link in one direction such as the UL to a further network device due to various reasons such as quality degradation in the UL.

Now communication technologies have evolved to the fifth generation new radio, which is also referred to as 5G NR, and the antenna device is typically comprised of a larger antenna array including massive antenna elements (AEs) to form a multiband antenna, for example. By way of example, the antenna device used in a radio cellular network often includes an antenna array that contains 192 AEs (96 dual polarized patches) to synthesize a desired beam pattern.

In a multiband antenna, the electromagnetic (EM) characteristics of a particular antenna element influence the other elements and are themselves influenced by the elements in their proximity. This inter-element influence or mutual coupling between the antenna elements is dependent on various factors, namely, number and type of antenna elements, inter-element spacing, size of elements, relative orientation of elements, radiation characteristics of the radiators, scan angle, bandwidth, direction of arrival of the incident signals, and the components of the feed network.

The presence of coupling in a multiband antenna changes the terminal impedances of the antenna elements, reflection coefficients, bandwidth, and the antenna gain. These fundamental properties of the multiband antenna have a greater influence on their radiation characteristics and output signal-to-interference plus noise ratio. Furthermore, it affects the steady state response, transient response, speed of response, resolution capability, and interference rejection ability. To solve the problems caused by the above-mentioned coupling phenomena, there are conventional solutions to increase the distance between a low band dipole and a high band dipole to weaken the EM coupling between different bands. These solutions are bound to increase the size of the antenna, which runs counter to today's increasing pursuit of miniaturized or compact antennas.

In order to at least partially address the above and other potential problems, example embodiments of the present disclosure provide a radiator and a radiation assembly for an antenna. Now some example embodiments will be described with reference to FIGS. 1-11.

Figure 2:
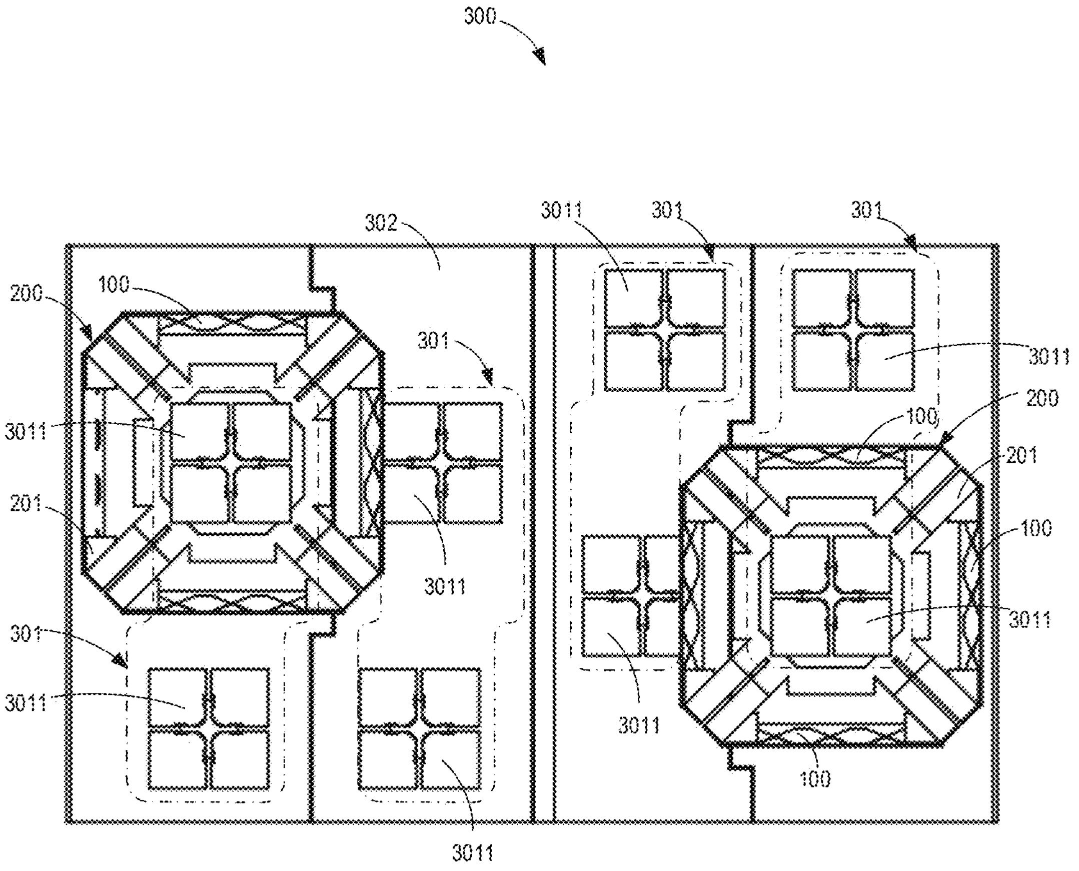
FIG. 2 shows a top view of a portion of array antennas acting as a multiband antenna as shown in FIG. 1 according to example embodiments of the present disclosure.

FIGS. 1 and 2 show a perspective view and a top view of a portion of array antennas 300 acting as a multiband antenna 300 according to example embodiments of the present disclosure. The multiband antenna 300 as shown in FIGS. 1 and 2 comprises at least two radiation assemblies for transmission and/or reception of radiation in different frequency bands, i.e., four high band radiation assemblies 301 and two low band radiation assemblies 200. In the array arrangement as shown in FIGS. 1 and 2, each low band radiation assembly 200 comprises a low band radiation unit, i.e., a low band dipole electrically coupled to a base plate 302. Furthermore, in adjacent two high band radiation assemblies 301, there are four high band radiation units 3011 electrically coupled to the base plate 302, one of which is arranged within a perimeter of the low band radiation unit. The base plate 302 may be a printed circuit board or a sheet metal underneath the high band radiation assemblies 301 and the low band radiation assemblies 200 to provide a ground plane layer for the whole radiation assemblies.

It is to be understood that the above example embodiments where one of the high band radiation units is arranged within a perimeter of the low band radiation unit are merely for illustrative purposes, without suggesting any limitation as to the scope of the present application. Any other suitable arrangement or structure is also possible. For example, in some alternative example embodiments, there is no high band radiation unit arranged within the perimeter of the low band radiation unit. That is, all of high band radiation units may be arranged outside of the low band radiation unit.

In addition, it is further to be understood that the "high band" and "low band" as mentioned herein are not absolute concepts, but relative concepts. In other words, both "high band" and "low band" may belong to any one of high-frequency band frequency, mid-frequency band frequency or low-frequency band frequency well-known in the art. In other words, regarding two different frequency bands, no matter whether the two frequency bands belong to the high-frequency band, mid-frequency band or low-frequency band known in the art, "high band" refers to the relatively higher frequency band of the two frequency bands, whereas "low band" refers to the relatively lower frequency band.

The array antennas 300 as shown in FIGS. 1 and 2 belong to an antenna arrangement with two low band radiation assemblies 200 and four high band radiation assemblies 301. In the array arrangement as shown in FIGS. 1 and 2, the radiator 100 according to example embodiments of the present disclosure can be applied to the low band radiation assemblies 200 to obtain a better decoupling effect.

It is to be understood that the antenna arrangement as shown in FIGS. 1 and 2, on which the radiator 100 according to example embodiments of the present disclosure is applied, is merely for illustrative purposes, without suggesting any limitation as to the scope of the present disclosure. The radiation assembly using the radiator 100 according to example embodiments of the present disclosure may be applied to any suitable multiband antenna arrangements which have one or more high band radiation assemblies and low band radiation assemblies to obtain a certain decoupling effect. For example, in some alternative example embodiments, the radiator 100 may comprise two low band radiation assemblies 200 and four high band radiation assemblies 301, where the radiator 100 may be applied to at least one of the two low band radiation assemblies 200. In the following, the concept of the present disclosure will be discussed in detail by taking the antenna arrangement as shown in FIGS. 1 and 2 as an example. Other antenna arrangements with the radiator 100 are similar, which will not be repeated respectively.

Figure 3:
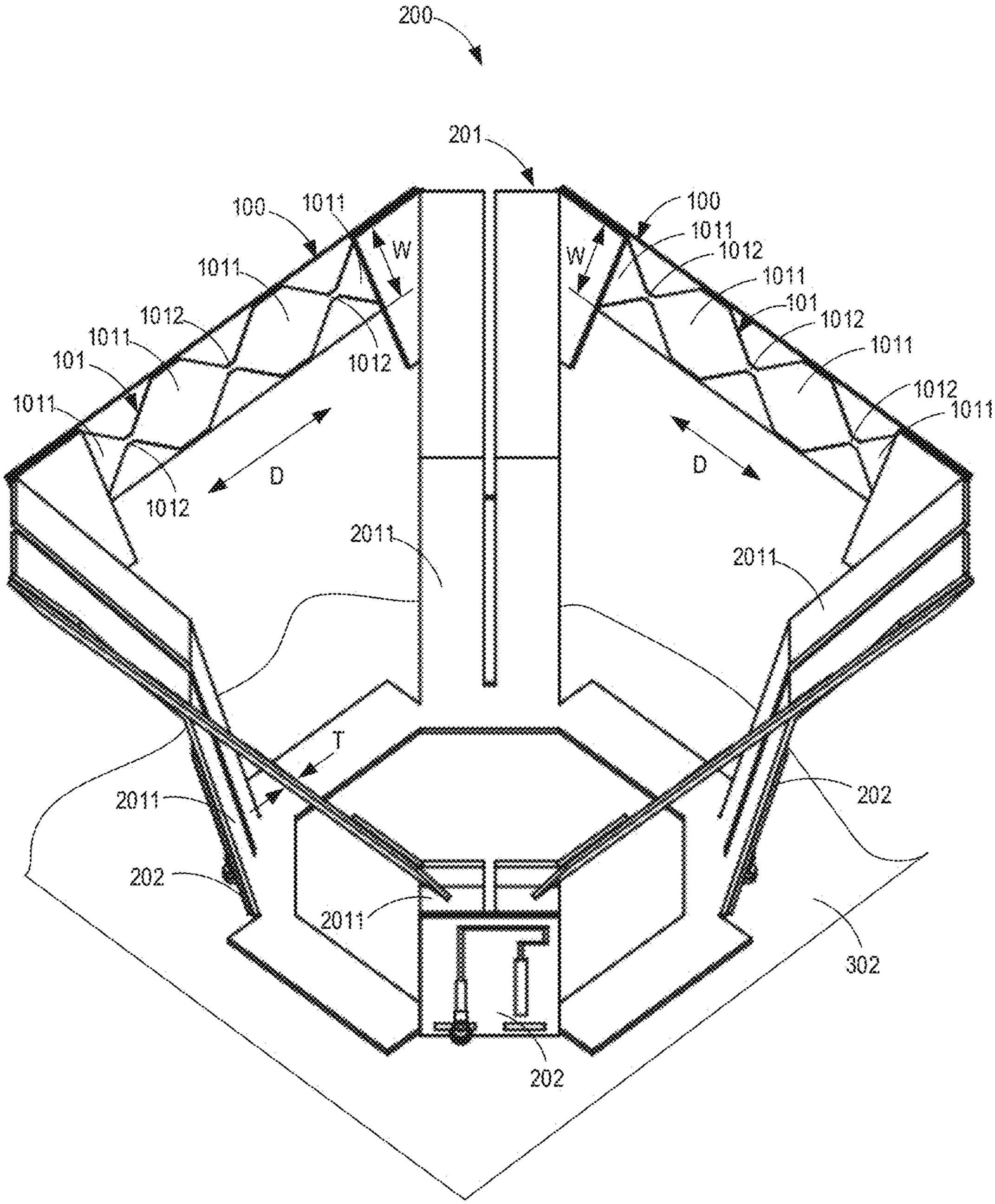
FIG. 3 shows a perspective view of a radiation unit according to example embodiments of the present disclosure.
Figure 4:
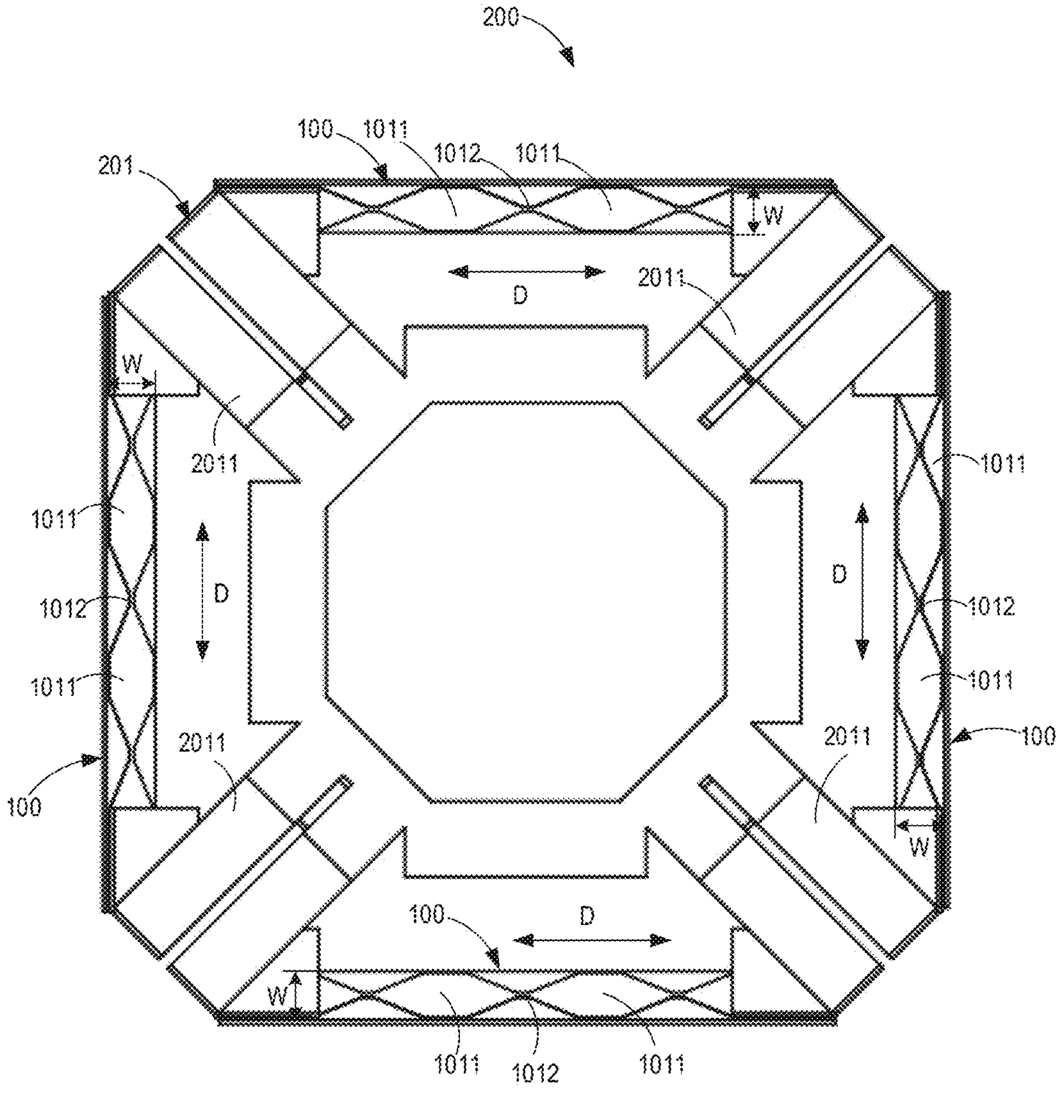
FIG. 4 shows a top view of a radiation unit according to example embodiments of the present disclosure.

The radiation assembly 200 to which the radiator 100 according to example embodiments of the present disclosure is applied may have any suitable structure. FIGS. 3 and 4 show in detail a structure of the radiation assembly 200 used in the antenna arrangement as shown in FIGS. 1 and 2. As shown in FIGS. 3 and 4, in some example embodiments, the radiation assembly 200 may comprise at least one dipole comprising a supporting portion 201 electrically coupled to the base plate 302, at least one feeding portion 202 and at least one radiator 100 according to example embodiments of the present disclosure acting as radiation portion(s). The supporting portion 201 comprises four branches 2011 extending from a first end adjacent to the base plate 302 to a second end away from the base plate 302, as shown in FIG. 3.

The feeding portion 202 and the radiator 100 are respectively electrically connected to different positions of the supporting portion 201. Specifically, as shown in FIGS. 3 and 4, the radiation assembly 200 comprises four radiators 100 acting as radiation portions and arranged perpendicular to each other. Each of the radiators 100 is galvanically coupled between second ends of at least two branches 2011. The radiation assembly 200 further comprises four feeding portion 202 each arranged on a lower portion, e.g., along the branch 2011 and adjacent to the first end of the corresponding branch 2011. In the case where the antenna 300 belongs to an emitting antenna system, the feeding portion 202 can convey radio frequency (RF) electrical current into the radiator 100 of the antenna 300, where the current is converted to radiation. In the case where the antenna 300 belongs to a receiving antenna system, the feeding portion 202 can convert the electric currents already collected from incoming radio waves into a specific voltage or current needed at the receiver.

Furthermore, in the radiation assembly 200 using the radiator 100 according to example embodiments of the present disclosure, the feeding portion 202 can excite the radiator 100 in any suitable methods comprising direct feeding and parasitically coupled feeding. In direct feeding, the radiator 100 is fed directly through a corporate feed network using T-junction and quarter wave transformers, which involves a galvanic coupling between the feeding portion 202 and the radiator 100. In parasitically coupled feeding, the radiator 100 is excited through a capacitive gap. The parasitically coupled feeding reduces the size further compared to the direct feeding.

It is to be understood that the above example embodiments where the radiator 100 is applied to the radiation assembly 200 as shown in FIGS. 3 and 4 are merely for illustrative purposes, without suggesting any limitation as to the scope of the present disclosure. The radiator 100 may be applied to any suitable radiation assembly 200 to act as a radiation portion of the radiation assembly 200 for transmission and/or reception of radiation. For example, in some alternative example embodiments, the radiator 100 may also be applied to the radiation assembly 200 comprising two, three, five, six or more radiation portions with any suitable arrangement.

Furthermore, FIGS. 3 and 4 show that all of the radiation portions, i.e., four radiation portions of the radiation assembly employ the radiators 100 to obtain a better radio frequency performance. It is to be understood that this is merely for illustrative purposes, without suggesting any limitation as to the scope of the present disclosure. In some alternative example embodiments, the radiator(s) 100 may only be used to replace some, for example, one, two or three, of the four radiation portions. For example, in some example embodiments, the radiators 100 may replace two of radiation portions adjacent to high band radiation assemblies. In the following, the concept of the present disclosure will be discussed in detail by taking the radiation assembly 200 as shown in FIGS. 3 and 4 as an example. Other radiation assemblies 200 with the radiators 100 or other arrangements of the radiators on the radiation assembly 200 are similar, which will not be repeated respectively.

The above describes several example embodiments of the radiation assembly 200 and the antenna 300 to which the radiator 100 according to example embodiments of the present disclosure can be applied. In the following, several example embodiments of the radiator 100 will be described in conjunction with FIGS. 5 to 11.

As shown in FIGS. 5 to 11, generally, the radiator 100 according to example embodiments of the present disclosure comprises a conductive body 101. The conductive body 101 is used as a radiation portion of the radiation assembly 200 to emit and/or receive electromagnetic waves, i.e., radiation in a predetermined frequency band, namely a first frequency band in the following. The conductive body 101 may be made of any suitable electrically conductive material. For example, in some example embodiments, the conductive body 101 may be made from a sheet metal such as a copper sheet arranged on a printed circuit board acting as a substrate. In this way, the radiator can be manufactured and assembled in a cost effective way.

It is to be understood that the above example embodiments where the conductive body 101 is a copper sheet are merely for illustrative purposes, without suggesting any limitation as to the scope of the present disclosure. The conductive body 101 may be manufactured in any suitable way. For example, in some alternative example embodiments, the conductive body 101 may be directly formed from metal sheets or metal plates made of metals such as copper, aluminum or iron or alloys thereof without a printed circuit board acting as a substrate. Furthermore, in some further alternative example embodiments, the conductive body 101 may also be made using any type of metal or conductive material formed onto a non-conductive support such as a plastic support, for example but not limited to: molded interconnect device (MID), laser direct structuring (LDS), heat-staked sheet metal onto a plastic support, etc.

Furthermore, in some example embodiments, the conductive body 101 may also have any suitable three-dimensional shape, for example, a cylindrical shape, a semi-cylindrical shape, or the like. In the following, the concept of the present disclosure will be discussed in detail by explaining possible shapes of the conductive body 101 as shown in FIGS. 5-11 as an example. Other shapes of the radiator are similar, which will not be repeated respectively.

The conductive body 101 comprises a plurality of first conductive members 1011 configured to radiate electromagnetic waves and at least one second conductive member 1012 configured to converge current at a particular point along a length direction D of the conductive body 101, as shown in FIGS. 5-11, which will be discussed further in the following. The first conductive member 1011 and the second conductive member 1012 are galvanically coupled together to form the conductive body 101 of the radiator 100. In some example embodiments, the plurality of first conductive members 1011 may be integrally formed with the at least one second conductive member 1012. In some alternative example embodiments, the plurality of first conductive members 1011 and the at least one second conductive member 1012 may also be separately formed and galvanically coupled together to form the conductive body 101 of the radiator 100. The length direction D herein means the main extending direction of the conductive body 101 in an extending surface. The conductive body 101 has a length along the length direction D and a width W along a width direction perpendicular to the length direction D and in the extending surface. The conductive body may also have a thickness T along a direction perpendicular to the length direction D and also perpendicular to the width W, as shown in FIG. 3.

Furthermore, for the conductive body 101 with the three-dimensional shapes such as a cylindrical shape, etc., the width of the conductive body 101 may mean a circumferential dimension of the conductive body 101 in a circumferential direction. In this event, the thickness of the conductive body 101 is the thickness of the copper sheet itself used to form the cylindrical conductive body 101.

In addition, in some alternative example embodiments, for the conductive body 101 with the three-dimensional shapes such as a cylindrical shape or a semi-cylindrical shape, etc., the width of the conductive body 101 may also mean a diameter or a longest chord length of the cylindrical conductive body 101. In the following, the concept of the present disclosure will be discussed in detail by taking the size, i.e., a length, a width or a thickness of the conductive body 101 as shown in FIGS. 5-11 as an example. Example embodiments about the size of the conductive body 101 with semi-cylindrical shapes are similar, which will not be repeated respectively.

The at least one second conductive member 1012 is galvanically coupled to the plurality of first conductive members 1011, e.g., arranged between two of the plurality of first conductive members 1011. The second conductive member 1012 has a size smaller than that of the first conductive member 1011 to thereby converge induced current electromagnetically coupled onto the radiator 100 by radiation in a second frequency band different from the first frequency band. That is, the first conductive members 1011 and the second conductive member 1012 together form a shape having a varied width, i.e., a serrated shape of the conductive body 101. In some example embodiments, the first conductive member 1011 may have one or more of following shapes, and not limited to: rhombus, kite, diamond, circle, ellipse, rectangle, hexagon, octagon, parallelogram, and trapezoid. In this way, the serrated shape of the conductive body 101 may be one or more of a zigzag shape, a toothed shape, a sawtooth shape, etc., which will be discussed further in the following. Furthermore, in some example embodiments, the radiation at the second frequency band as mentioned above is coupled from a high band radiation assembly 301 to the radiation assembly 200, and the high band radiation assembly 301 being physically displaced from the radiation assembly 200, i.e., the radiation assembly 301 may comprise a high band dipole configured to operate at a frequency band higher than the first frequency band.

It is to be understood that a frequency band, e.g., the second frequency band higher than another frequency band, i.e., the first frequency band herein means that the highest frequency in the second frequency band may be higher than the highest frequency in the first frequency band, but the frequencies in the two frequency bands may or may not overlap. For example, in a case where the frequencies in the two frequency bands do not overlap, the lowest frequency in the second frequency band is higher than the highest frequency in the second frequency band.

The term "converge" herein means that current is concentrated or converged in a limited size, making it difficult to provide further or secondary radiation and/or to negatively affect the radiation performance of the radiation assembly 200. With the at least one second conductive member 1012, on the one hand, from the perspective of electromagnetic radiation, the conductive surface on which electromagnetic radiation of the radiation in the second frequency band acts to induce current is reduced, thereby reducing the amount of the electromagnetic coupling from the radiation in different frequency band from the first frequency band. On the other hand, the induced current is converged in a limited size to provide poor radiation efficiency at the higher frequency band. In this way, the secondary radiation from the induced current is weakened as well, to thereby reduce or remove the secondary radiation generated by the induced current and thus to improve or maintain the performance of characteristics such as the gain and the radiation pattern, etc., of the antenna system.

With the radiation portion comprising the radiator 100, the different band radiation assemblies do not need to be far away from each other to achieve good performance. In this case, the antenna 300 can be made more compact, thereby further saving, for example, limited space in a network device such as a base station. Furthermore, in a case where the volume and/or size of the antenna 300 are fixed, more radiation assemblies 200, 301 operating at different frequency bands are allowed to be arranged in the antenna 300, thereby increasing the radiation range of the network device without degrading the performance of any of the radiation assemblies 200, 301 operating in different operational frequency bands and even the base station.

Figure 5:
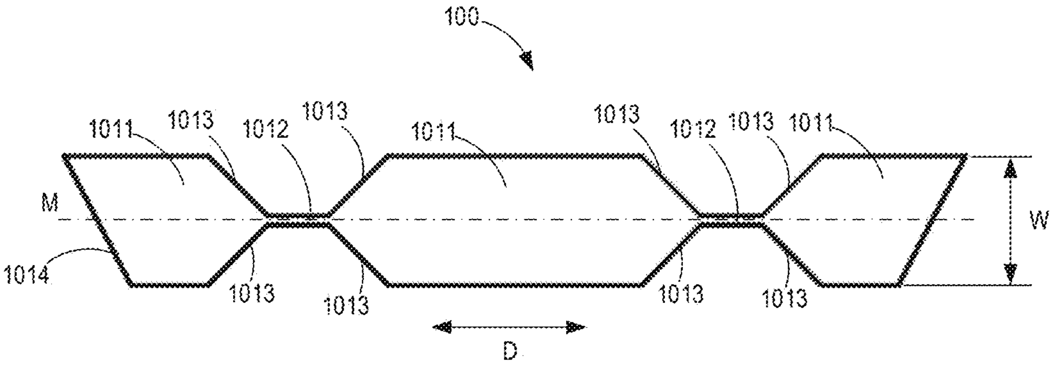
FIGS. 5-11 show several example arrangements of a radiator according to example embodiments of the present disclosure.

Numbers and shapes of the first conductive members 1011 and the second conductive member 1012 may be varied according to factors such as the length of the conductive body 101, the wavelengths of the first frequency band and second frequency band, etc. For example, as shown in FIG. 5, in some example embodiments, the conductive body 101 may comprise three first conductive members 1011 and two second conductive members 1012 arranged every adjacent two first conductive members 1011. FIGS. 6-11 show example embodiments where the conductive body 101 comprises four first conductive members 1011 and three second conductive members 1012 arranged between adjacent first conductive members 1011.

In some example embodiments, to provide a better performance, the second conductive member 1012 may be arranged at a predetermined distance, which is measured along a midline, namely a first midline M in the following, from an edge 1014 of the conductive body 101 in the length direction D where the induced current is more concentrated than other locations of the conductive body 101. As is well known, the induced current electromagnetically coupled by the radiation in the second frequency band e.g., larger than the first frequency band is uneven on the conductive body 101. According to factors such as the wavelengths of the second frequency band and the size of the conductive body 101, etc., the induced current generated by the radiation with the second frequency band is usually concentrated in one or more specific locations e.g., at a predetermined distance from the edge 1014 of the conductive body 101 in the length direction D. By arranging the second conductive member 1012 to the one or more specific locations, the electromagnetic coupling of radiation with the second frequency band on the radiator 100 can be further reduced. In this way, the performance of characteristics such as the gain and the radiation pattern, etc., of the antenna system can be further improved.

In some example embodiments, the plurality of first conductive members 1011 may have a width larger than a width of the at least one second conductive member 1012. In some example embodiments, the width of the second conductive member 1012 may be constant. In some alternative example embodiments, the second conductive member 1012 may also have varied widths. The varied widths may be within a predetermined range that would not affect the convergence of the induced current. Similarly, the first conductive members 1011 each may have a constant width or varied widths as well, which will be further discussed in the following.

In some example embodiments, the width of the second conductive member 1012 is sized to be below, i.e., equal to or smaller than a quarter of the width of the first conductive member 1011. In this way, the induced current electromagnetically coupled by the radiation with the second frequency band can be more converged on the second conductive member 1012 to thereby improve radio frequency performance of the low band radiation assembly 200.

For a length of the second conductive member 1012, in some example embodiments, the second conductive member 1012 may have the length below, i.e., equal to or smaller than one-eighth of a center wavelength of the radiation in the second frequency band. The center wavelength is a wavelength of the radiation corresponding to a center frequency in the frequency band. In this way, the induced current electromagnetically coupled by the radiation with the second frequency band and flowing through the second conductive member 1012 has poor radiation efficiency due to the limited size of the second conductive member 1012. In this way, the impact and interference of the induced current to the radiation with the second frequency band may be further reduced, to thereby improve the performance of the high band radiation assembly for transmission of the radiation with the second frequency band.

In some example embodiments, for the antenna comprising low band radiation assemblies 200 operating at 690-960 MHz and high band radiation assemblies 301 operating at 1427-2690 MHz, the radiator 100 for the low band radiation assembly 200 may have a length of about 140 mm and a width of about 15 mm. The maximal width of the first conductive member 1011 may be the same as the width of the radiator 100. At least one second conductive member 1012 may be arranged in a certain range from the edge 1014 of the conductive body 101 in the length direction D, e.g., at least one-quarter to one-eighth of a center wavelength of the radiation in the second frequency band from the edge 1014. The width of the second conductive member 1012 may be below a quarter of the width of the first conductive member 1011, i.e., below about 3.75 mm and the length of the second conductive member 1012 may be below one-eighth of the center wavelength of the radiation in the second frequency band, i.e., below about 18.75 mm.

In some example embodiments, as shown in FIGS. 5-11, the width of the first conductive member 1011 may not be constant. For example, in some example embodiments, the first conductive member 1011 may comprise at least one tapered portion 1013 to mainly provide a gradient width of the first conductive member 1011, e.g., from the maximal width of the first conductive member 1011 to the width of the second conductive member 1012. In this event, the width of the first conductive member 1011 as mentioned above may be a maximal width of the first conductive member 1011. With the tapered portion 1013, the first conductive member 1011 may have one or more of the following shapes, and not limited to: rhombus, kite, diamond, circle, ellipse, rectangle, hexagon, octagon, parallelogram, and trapezoid, as mentioned above. In this way, the induced current electromagnetically coupled by the radiation with the second frequency band is easier to converge in the second conductive member 1012, thereby resulting in smaller secondary radiation by the induced current and further improving the performance of the antenna.

Figure 6:
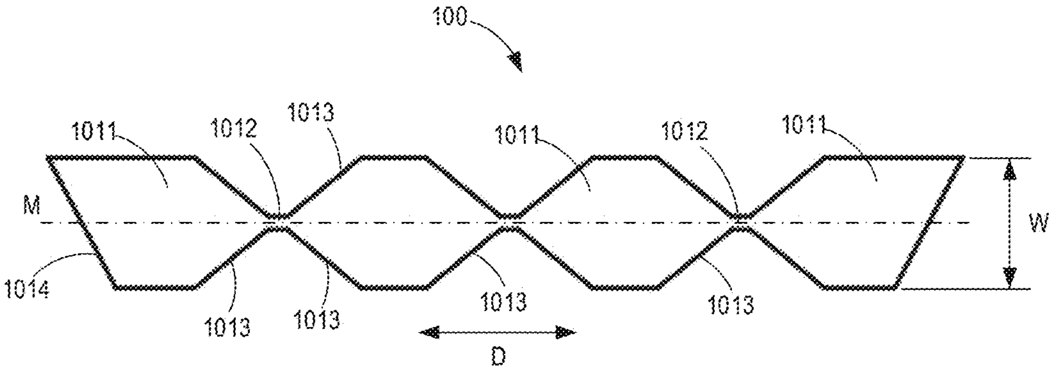

The slope of the tapered portion 1013 may be constant. For example, in some example embodiments, as shown in FIGS. 5 and 6, the width of the tapered portion 1013 may be linearly reduced from the maximal width of the first conductive member 1011 to the width of the second conductive member 1012 with a constant slope. Besides the tapered portion 1013, the first conductive member 1011 may further comprise a portion with the maximal width and having a predetermined length. This arrangement may improve the radio frequency performance of the radiator. In some alternative example embodiments, the predetermined length of the portion with the peak width may also be zero. That is, the tapered portions 1013 of the first conductive member 1011 adjacent to the second conductive members 1012 in the length direction D may intersect.

Figure 7:
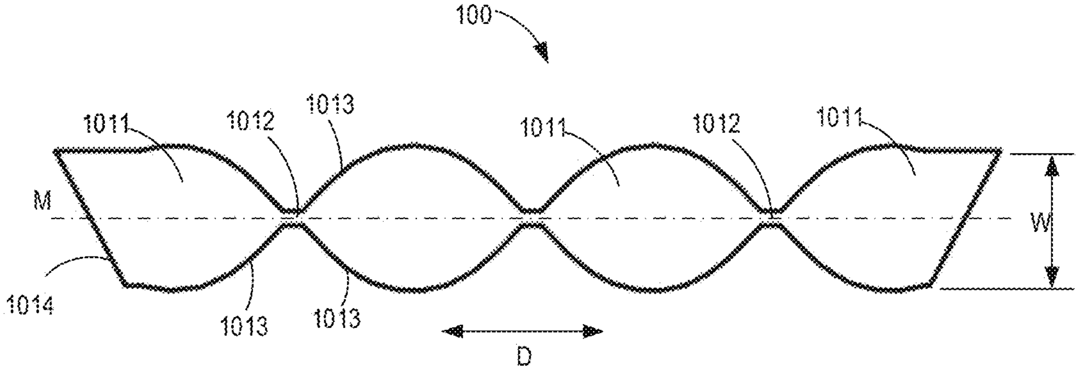

It is to be understood that the above example embodiments where the slope of the tapered portion 1013 is constant are merely for illustrative purposes, without suggesting any limitation as to the scope of the present disclosure. The slope of the tapered portion 1013 may also be variable. For example, in some alternative example embodiments, as shown in FIG. 7, the tapered portion 1013 and even the other portions of the first conductive member 1011 may follow an appropriate curve, e.g., a sine curve, a cosine curve, a circular arc curve, a wave curve with a predetermined wavelength and frequency, etc.

Figure 8:
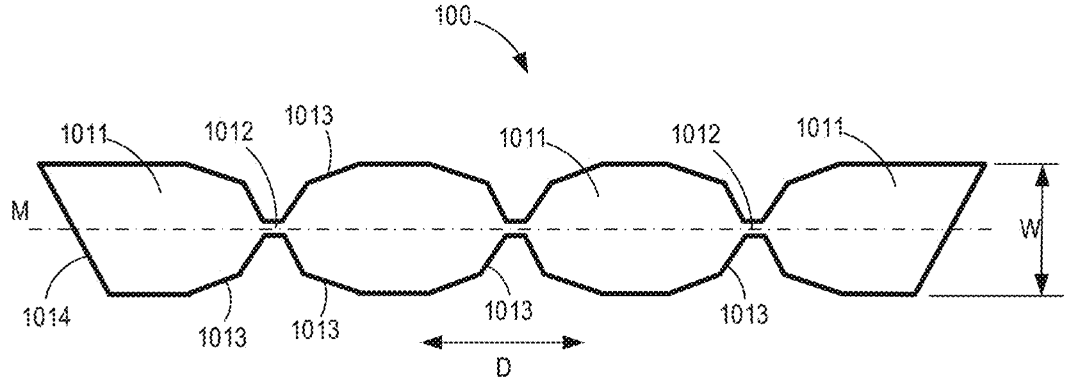
Figure 9:
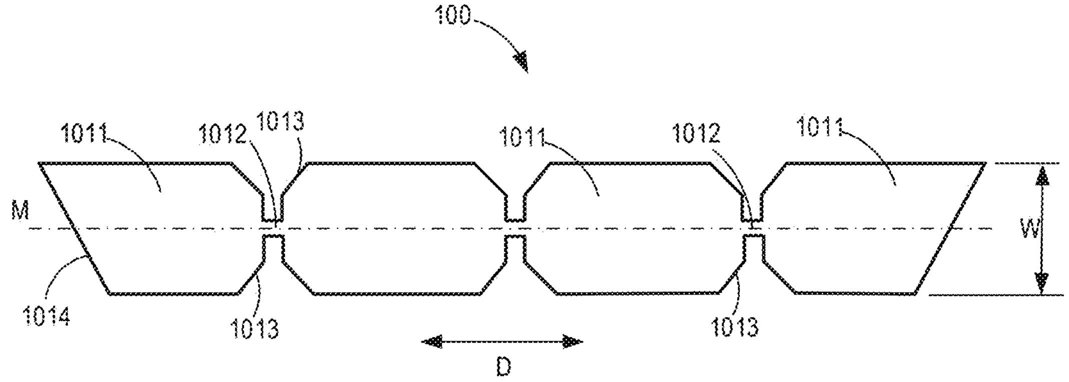

In some further alternative example embodiments, the tapered portion 1013 may also comprise a plurality of sections whose widths change linearly, as shown in FIG. 8. This arrangement can facilitate the designing and manufacturing of the radiator 100. In addition to the above, the tapered portion 1013 may also have any other suitable structure. For example, in some example embodiments, a width of the tapered portion 1013 may be gradually reduced from the maximal width of the first conductive member 1011 to an intermediate width between the maximal width of the first conductive member 1011 and the width of the second conductive member 1012, as shown in FIG. 9. In some alternative example embodiments, the tapered portion 1013 may also be omitted. These arrangements of the tapered portion 1013 make the manufacturing of the radiator 100 more flexible.

In some example embodiments, the conductive body 101 may be at least partially symmetrical with respect to at least one of the midlines of the conductive body 101, i.e., a first midline M extending along the length direction D and a second midline extending in a width direction perpendicular to the length direction D. For example, as shown in FIGS. 5-9, the conductive body 101 is symmetrical with respect to the second midline extending along the width direction. Furthermore, except for two ends of the conductive body 101 in the length direction D which have predetermined shapes for easy installation on the supporting portion 201, the conductive body 101 is symmetrical with respect to the first midline M extending along the length direction D as well.

Figure 10:
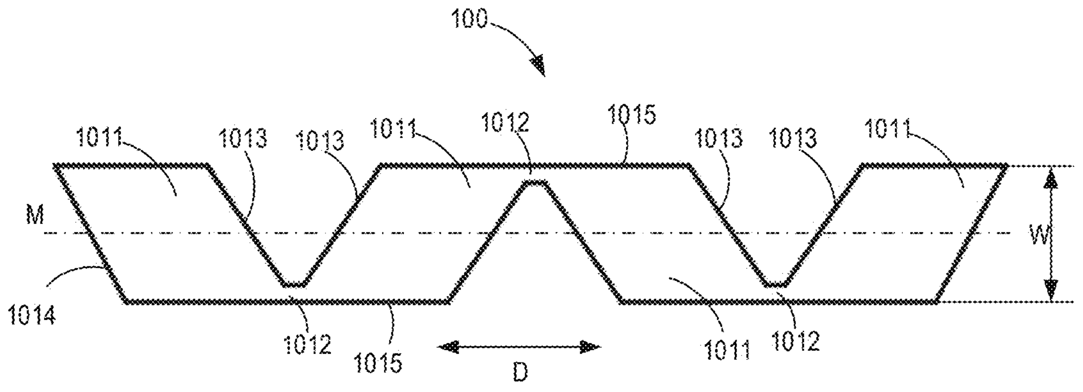
Figure 11:
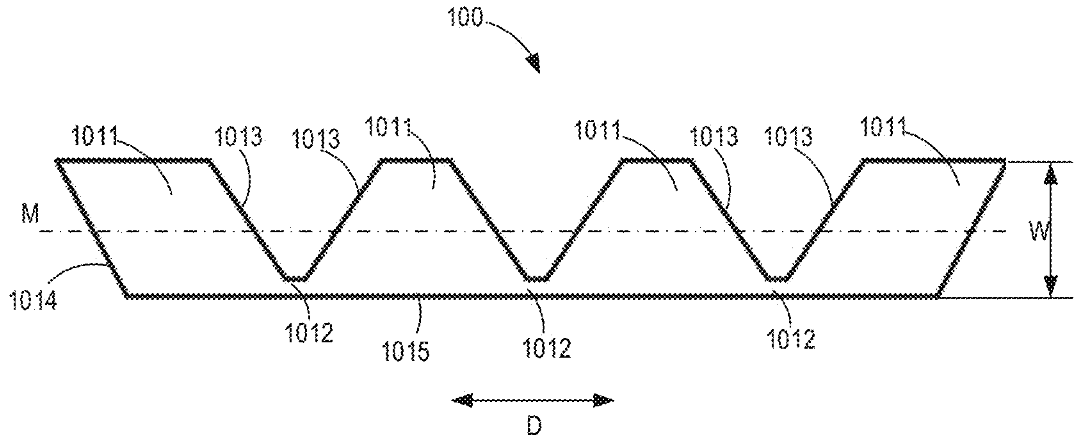

In some alternative example embodiments, the conductive body 101 may also be asymmetrical with respect to the first midline M extending along the length direction D or the second midline extending along the width direction. For example, in some example embodiments, the at least one second conductive member 1012 may be arranged on a side of the first midline M of the conductive body 101. In some example embodiments, the at least one second conductive member 1012 may be asymmetrically arranged with respect to the first midline M, so that an edge of the at least one second conductive member 1012 may be flush with a corresponding edge 1015 of the first conductive member 1011 in the width direction, as shown in FIGS. 10 and 11.

Furthermore, for the case where there is a plurality of second conductive members 1012, the second conductive members 1012 may also be alternatively arranged on opposite sides of the first midline M extending along the length direction D. These arrangements of the second conductive members 1012 and the first conductive members 1011 can improve the flexibility of manufacturing the radiator. In addition, the positions of the second conductive members 1012 can be adjusted according to factors such as the concentration of the induced current, to further improve the radio frequency performance of the low band radiation assembly 200.

According to a further aspect of the present disclosure, a base station is provided. The base station comprises at least one radiation assembly 200 as mentioned above. With the radiation assembly 200 as the low band radiation assembly, the performance of characteristics such as the gain and the radiation pattern, etc., of the base station can be improved.

According to a further aspect of the present disclosure, an antenna enclosure comprising at least one radome for housing at least one radiation assembly 200 as mentioned above is provided. With the radiation assembly 200 as the low band radiation assembly, more radiation assemblies operating at different frequency bands can be arranged in the antenna, thereby increasing the radiation range of the base station without degrading the performance of the antenna and even the base station.

Figure 12:
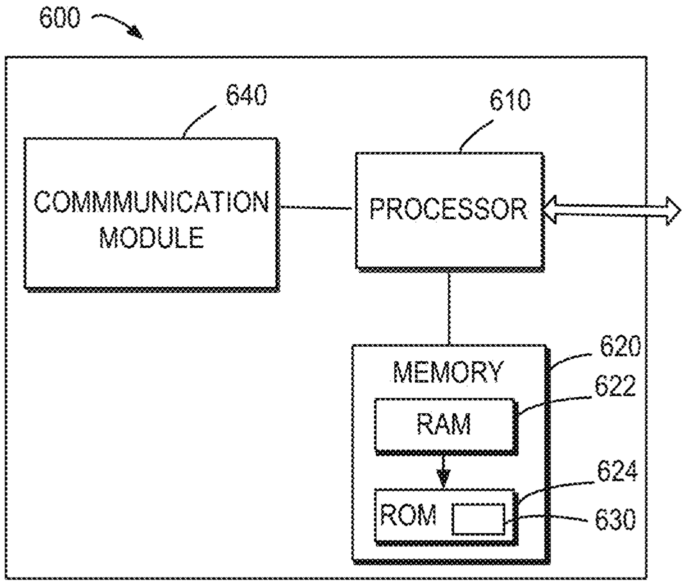
FIG. 12 illustrates a simplified block diagram of an apparatus that is suitable for implementing example embodiments of the present disclosure.

FIG. 12 is a simplified block diagram of a device 600 that is suitable for implementing example embodiments of the present disclosure. As shown, the device 600 includes one or more processors 610, one or more memories 620 coupled to the processor 610, and one or more communication modules 640 coupled to the processor 610.

The communication module 640 is for bidirectional communications. The communication module 640 has at least one antenna such as the array antennas and/or the multiband antenna as mentioned above to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the memory, e.g., ROM 624. The processor 610 may perform any suitable actions and processing by loading the program 630 into the RAM 622.

It should be appreciated that the above detailed example embodiments of the present disclosure are only to exemplify or explain principles of the present disclosure and not to limit the present disclosure. Therefore, any modifications, equivalent alternatives and improvement, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. A radiation assembly, comprising:

a supporting portion comprising a conductive material and having at least two branches;

a feeding portion electrically coupled to the supporting portion; and a radiator comprising a conductive body for transmission and/or reception of radiation in a first frequency band, with the conductive body galvanically coupled between ends of the at least two branches of the supporting portion and configured as at least a portion of a radiating arm, the conductive body extending in a length direction and comprising:

a plurality of first conductive members having a first size; and a second conductive member galvanically coupled to the plurality of first conductive members and having a second size smaller than the first size of each of the plurality of first conductive members, the second conductive member being configured to inhibit electromagnetic coupling to and/or from the conductive body in a second frequency band different from the first frequency band, wherein the feeding portion extends outwardly and forwardly from the supporting portion to physically and electrically connect the radiator to the supporting portion.

2. The radiation assembly of claim 1, wherein:

the first size comprises a first width in a width direction orthogonal to the length direction, the second size comprises a second width in the width direction, and the first width of each of the plurality of first conductive members is larger than the second width of the second conductive member.

3. The radiation assembly of claim 2, wherein the second width of the second conductive member is below a quarter of the first width of the plurality of first conductive members, and wherein the second size comprises a second length, and the second length of each second conductive member of the second conductive member is shorter than one-eighth of a center wavelength in the second frequency band.

4. The radiation assembly of claim 1, wherein the second conductive member is arranged at a predetermined distance from an edge of the conductive body in the length direction.

5. An antenna configured to operate in multiple frequency bands, the antenna comprising:

the radiation assembly of claim 1; and a second radiation assembly arranged within a perimeter of the radiation assembly and configured to operate in the second frequency band.

6. A radiation assembly, comprising:

a supporting portion comprising a conductive material;

a feeding portion electrically coupled to the supporting portion; and a radiator comprising:

a conductive body adapted to be arranged in an antenna for transmission and/or reception of radiation in a first frequency band, the conductive body extending in a length direction and comprising:

a plurality of first conductive members having a first size; and a second conductive member galvanically coupled to the plurality of first conductive members and having a second size smaller than the first size of each of the plurality of first conductive members, the second conductive member being configured to inhibit electromagnetic coupling to and/or from the conductive body in a second frequency band different from the first frequency band, wherein the radiator is galvanically coupled between ends of the at least two branches of the supporting portion and configured as at least a portion of a radiating arm wherein the radiation assembly comprises a dipole comprising:

the radiator, with the conductive body configured as at least a portion of a first radiating arm of the dipole; and a second radiator, comprising:

a second conductive body galvanically coupled between ends of at least two branches of the supporting portion and configured as at least a portion of a second radiating arm of the dipole that is configured to be fed together with the first radiating arm, the second conductive body extending in a second length direction orthogonal to the length direction and comprising:

a plurality of third conductive members having a third size; and a fourth conductive member galvanically coupled to the plurality of third conductive members and having a fourth size smaller than the third size of each of the plurality of third conductive members, the fourth conductive member being configured to inhibit electromagnetic coupling to and/or from the second conductive body in the second frequency band.

7. An antenna configured to operate in multiple frequency bands and comprising:

the radiation assembly of claim 6 configured to operate in the first frequency band; and a second radiation assembly arranged within a perimeter of the radiation assembly and configured to operate in the second frequency band.

8. An antenna, comprising:

a feed;

a conductive support;

a first radiating arm electrically coupled to the feed via the conductive support, the first radiating arm comprising a first conductive member comprising:

a first end conductively coupled to the conductive support;

a first portion conductively coupled to the first end and having a first conductive surface area configured to support radiation at a first frequency; and a second portion conductively coupled to the first portion and having a second conductive surface area smaller than the first conductive surface area and configured to inhibit radiation at a second frequency different from the first frequency; and a second radiating arm electrically coupled to the feed via the conductive support, the first and second radiating arms extending orthogonally to one another and being configured to operate together at the first frequency in a first polarization, wherein the second conductive member is arranged at a predetermined distance from an edge of the conductive body in the length direction so that the second conductive member is at a location where an induced current in a second frequency band concentrates more heavily.

9. The antenna of claim 8, further comprising:

a second feed, wherein the first conductive member further comprises a second end conductively coupled to the conductive support and electrically coupled to the second feed via the conductive support, with the first and second portions conductively coupled between the first and second ends.

10. The antenna of claim 9, further comprising:

a third radiating arm electrically coupled to the second feed via the conductive support, the third radiating arm extending orthogonally to the first radiating arm and parallel to the second radiating arm, and the first and third radiating arms being configured to operate together at the first frequency in a second polarization.

11. The antenna of claim 8, wherein the second radiating arm comprises a second conductive member comprising:

a second end conductively coupled to the conductive support;

a third portion conductively coupled to the second end and having a third conductive surface area configured to support radiation at the first frequency; and a fourth portion conductively coupled to the third portion and having a fourth conductive surface area smaller than the third conductive surface area and configured to inhibit radiation at the second frequency.

12. The antenna of claim 8, wherein the first portion is positioned to at least partially align with a first current peak at the first frequency and the second portion is positioned to at least partially align with a second current peak at the second frequency.

13. The antenna of claim 8, wherein:

the first portion is offset from the first end in a first direction; and the second portion is offset from the first end in the first direction.

14. The antenna of claim 8, further comprising a second radiation assembly that is configured to operate in the second frequency band.

15. A radiation assembly comprising:

a supporting portion comprising a conductive material and having at least two branches; and a conductive body for transmission and/or reception of radiation in a first frequency band, with the conductive body galvanically coupled between ends of the at least two branches of the supporting portion and configured as at least a portion of a radiating arm, the conductive body extending in a length direction and comprising:

a plurality of first conductive members having a first size; and a second conductive member galvanically coupled to the plurality of first conductive members and having a second size smaller than the first size of each of the plurality of first conductive members, the second conductive member being configured to inhibit electromagnetic coupling to and/or from the conductive body in a second frequency band different from the first frequency band, wherein a first of the plurality of first conductive members comprises at least one tapered portion that is configured to converge an induced current electromagnetically coupled by the radiation in the second frequency band in the second conductive member.

16. The radiation assembly of claim 15, wherein the width of the tapered portion is linearly reduced from the maximal width of the first conductive member to the width of the second conductive member.

17. The radiation assembly of claim 15, wherein a slope of the tapered portion is variable.

18. The radiation assembly of claim 15, further comprising:

a feeding portion electrically coupled to the supporting portion, wherein the feeding portion extends outwardly and forwardly from the supporting portion to physically and electrically connect the radiating arm to the supporting portion.

19. An antenna configured to operate in multiple frequency bands, the antenna comprising:

the radiation assembly of claim 15; and a second radiation assembly arranged within a perimeter of the radiation assembly and configured to operate in the second frequency band.

* * * * *